United States Patent [19]

Perego

[11] Patent Number: 5,599,160
[45] Date of Patent: Feb. 4, 1997

[54] APPARATUS AND METHOD FOR PUTTING CASSETTES INTO TRAYS

[75] Inventor: Luciano Perego, Milan, Italy

[73] Assignee: Tapematic U.S.A., Inc., Orlando, Fla.

[21] Appl. No.: 343,121

[22] Filed: Nov. 22, 1994

[51] Int. Cl.⁶ .................................................. B65G 60/00
[52] U.S. Cl. .................. 414/799; 414/798.9; 414/798.3; 414/932; 414/927; 53/542; 53/544; 53/250
[58] Field of Search ................................. 414/932, 798.2, 414/798.9, 798.3, 331, 927, 799, 798.5, 798.6, 798.8; 53/473, 539, 542, 544, 249, 250, 252

[56] References Cited

U.S. PATENT DOCUMENTS

| | | | |
|---|---|---|---|
| 3,783,584 | 1/1974 | Rauser | 414/799 X |
| 4,354,589 | 10/1982 | Fluck | 414/798.3 X |
| 4,462,746 | 7/1984 | Smets | 414/798.9 X |
| 5,399,063 | 3/1995 | Passero | 414/798.9 |

FOREIGN PATENT DOCUMENTS

| | | | |
|---|---|---|---|
| 2579188 | 9/1986 | France | 414/798.9 |
| 9221597 | 12/1992 | WIPO | 414/798.9 |

*Primary Examiner*—Frank E. Werner
*Attorney, Agent, or Firm*—Edgar H. Haug

[57] ABSTRACT

A plurality of tape cassettes fed in succession from a conveyor are oriented vertically on an end stretch of the conveyor itself terminating at a position in side by side relation with a tiltable collection element. The cassettes are pushed laterally from the end stretch of the feed conveyor for being loaded onto the collection element until they form thereon a row comprised of a given number of cassettes. The collection element is then tilted to let the cassette row fall onto a tray previously positioned under the collection element.

23 Claims, 2 Drawing Sheets

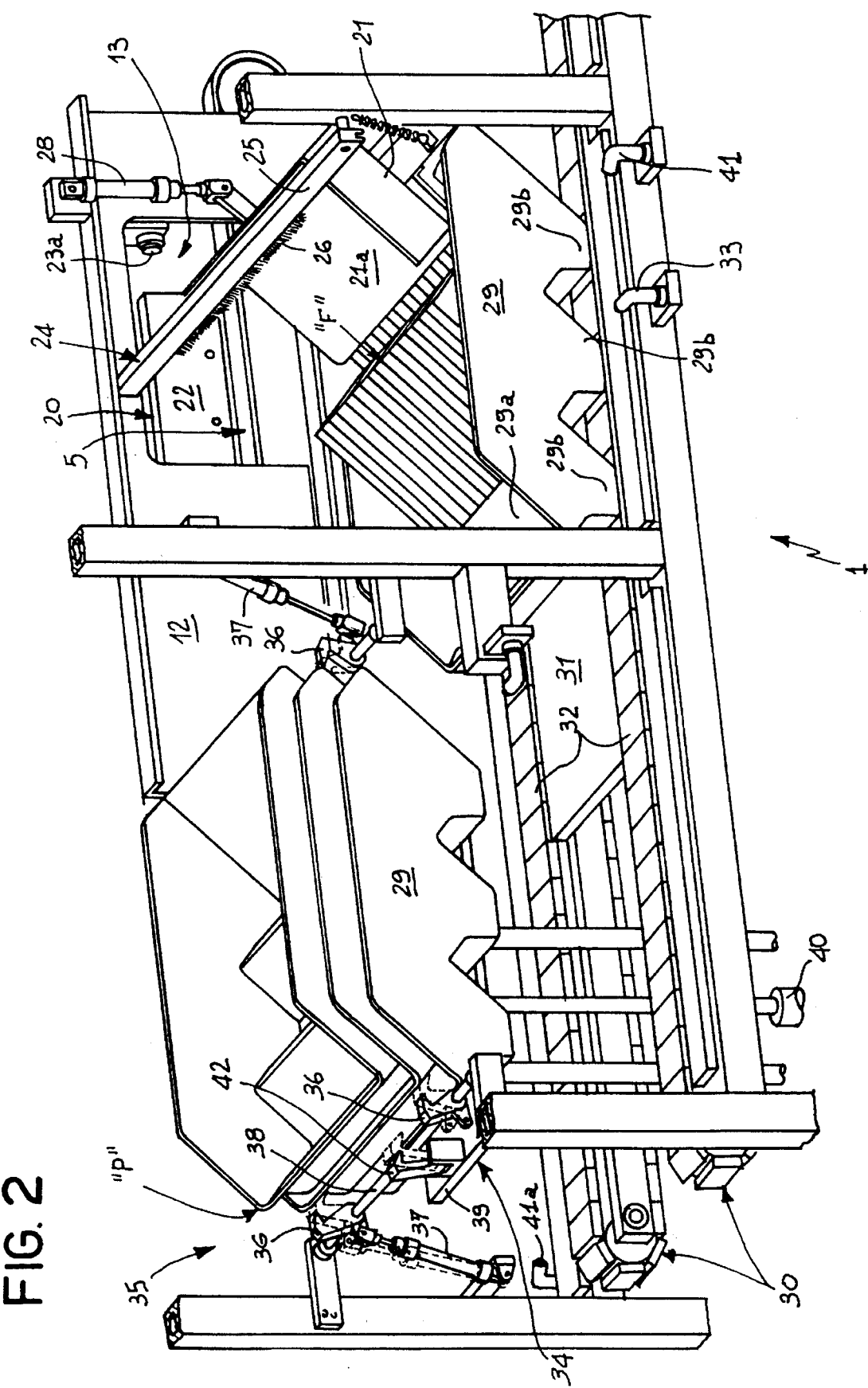

APPARATUS AND METHOD FOR PUTTING CASSETTES INTO TRAYS

FIELD OF THE INVENTION

The present invention relates generally to cassette processing and more particularly to a method and apparatus for disposing cassettes in trays for transportation between work stations.

BACKGROUND OF THE INVENTION

In audio and video tape cassette processing and packaging, the cassettes coming from a given work station must be collected in an orderly manner in trays so that the cassettes can be easily carried to the next work station where they can be picked up again and submitted to further processing.

For example, cassette collection into trays is usually carried out immediately after the assembly of the cassettes shells from their multitude of different parts in order to make it easier to transfer them to the work station where the tape will be wound into the cassettes. Similarly, the cassettes are collected in trays after the magnetic tape winding steps, in order to transfer them to the stations where boxing, packaging and labelling operations are carried out.

Presently, all operations necessary for storing cassettes in trays are conducted in a completely manual manner. Typically, cassettes coming from a given work station are output onto a belt conveyor. At the end of the conveyor an operator picks them up, by hand, and puts them into the trays. This operation involves significant labor expense, at least in part because the speed of automatic machines presently employed in cassette packaging operations requires the attention of more than one operator.

Thus, in order to meet the need for ever increasing productivity, with a reduction in the costs of manufacturing, automation of the tray packing operation is highly desirable.

SUMMARY OF THE INVENTION

Therefore it is an object of the present invention to provide an apparatus and method adapted to carry out the completely automated introduction of cassettes into trays, at a speed capable of matching the output of a plurality of machines running at a very high production rate.

The foregoing and further objects that will become more apparent in the course of the present description are substantially attained by an apparatus for disposing cassettes into trays, comprising a collection element movable between a rest position and a tilted position, a transferring unit arranged to pick up from a conveyor, cassettes arriving at a transferring station to dispose them onto the collection element in side-by-side relation, thereby forming a row of cassettes, tray supporting and moving means selectively operable to shift a housing tray to a slide surface underneath the collection element, drive means for causing the displacement of the collection element when a given number of cassettes has been transferred thereon, from the rest position to the tilted position, so that the cassette row formed thereon will fall into the underlying tray.

The present invention also comprises a method of disposing magnetic tape cassettes into housing trays, wherein the cassettes are supplied from a feed conveyor, comprising the steps of positioning a tray proximate a collection element, moving individual cassettes from the feed conveyor and transferring them onto a surface of the collection element until a row of cassettes is formed on the surface, moving the collection element from a rest position for supporting the tape cassettes to a working position in which on the surface that the cassette row formed on the surface falls into the underlying tray and moving the tray to make it ready to receive a new cassette row from the collection element.

BRIEF DESCRIPTION OF THE DRAWINGS

Further features and advantages will become more apparent from the detailed description of a preferred embodiment of the present invention, which description is given hereinafter by way of non-limiting example with reference to the accompanying drawings, in which:

FIG. 2 is a perspective side view, viewed from the opposite side with respect to FIG. 1, during an operating step in which the cassette row has been discharged into the tray, and a new tray is about to be picked up from a storage station.

DESCRIPTION OF THE PREFERRED EMBODIMENT

Figure 1:
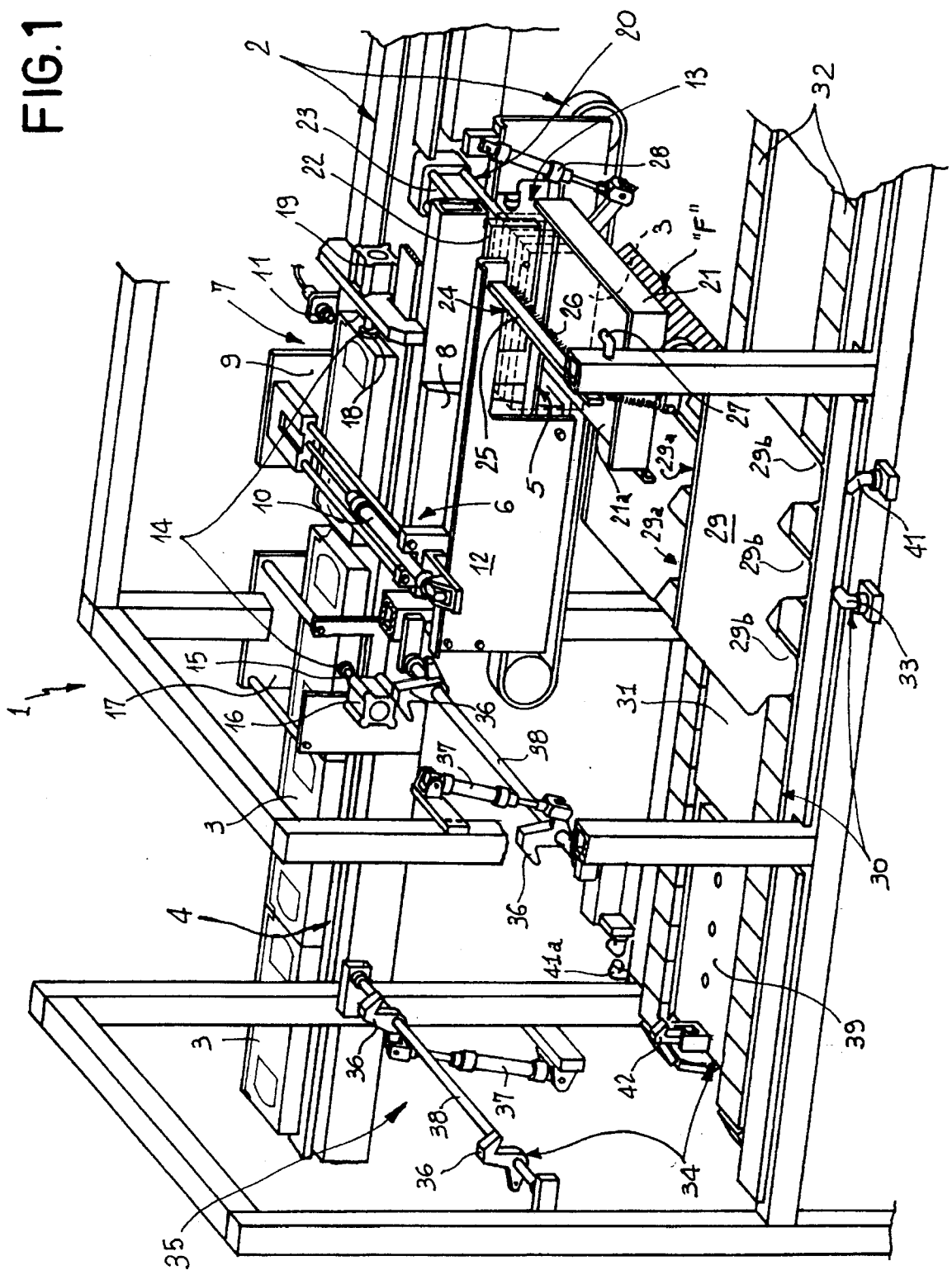
FIG. 1 is a fragmentary perspective view showing the apparatus of the invention in an operating step in which the tape cassettes are about to be loaded onto a collection element so as to form a cassette row thereon, to be subsequently discharged into an underlying tray.

Referring to the drawings, reference numeral 1 generally denotes an apparatus for introducing cassettes into trays.

As shown in FIG. 1, the apparatus 1 comprises a feed conveyor 2, which is preferably a continuous belt conveyor, carrying out transportation of a plurality of tape cassettes 3, (in the example shown herein the cassettes are VHS video cassettes). The cassettes are disposed on the conveyor one after the other, in mutual alignment, in a common plane.

In accordance with one embodiment of the present invention, the belt conveyor 2 has a primary stretch 4 which is advantageously disposed in alignment with and as an extension of an out-feed conveyor associated with one or more tape loading machines, cassette assembly machines, cassette boxing machines or cassette labelling machines (not shown). The primary stretch 4, on which the cassettes 3 are disposed, is followed by an end stretch 5 disposed parallel thereto and which is adapted to receive the cassettes in a vertical orientation and send them to a transferring station 13. An orientation means 6, which acts at an intermediate station 7 interposed between the primary stretch 4 and end stretch 5, changes the orientation of the individual cassettes 3 from a horizontal position to a vertical position. However, if the cassettes are pre-oriented in a vertical direction, the primary stretch 4, intermediate station 7 and orientation means 6 can be eliminated, and the cassettes sent directly to the end stretch 5.

When employed, the orientation means 6 advantageously comprises a guide chute 8, mounted alongside the primary stretch 4, substantially in a plane which is at a lower position than the primary stretch 4.

A first pusher element 9 is disposed in alignment with the guide chute 8. The pusher element 9 is transversely movable over the primary stretch 4 of the conveyor 2, upon the action of a first fluid-operated actuator 10 operable upon command of a first photoelectric cell 11 placed in the intermediate station 7. In greater detail, the first pusher element 9 moves between a stand-by position in which it is disposed in side-by-side relation with the primary stretch 4 on the opposite side from the guide chute 8 and a thrusting position in which it is located very close to the guide chute 8 to push the cassette 3. A stop wall 12, disposed alongside the end stretch 5, stops the tilting movement imposed on cassettes 3 falling from the primary stretch 4 onto the chute itself. This rotates the cassettes approximately 90° so that they fall onto the end stretch 5 in vertical orientation.

In one embodiment of the present invention, a separation means 14 is provided upstream of the transferring station 13 to separate the first cassette being pushed onto the end stretch 5 from the cassette coming immediately after it. This avoids any possible mechanical interference and/or rubbing between the cassettes during the transverse displacement of the cassettes from the primary stretch 4 to the end stretch 5 of the feed conveyor 2.

In greater detail, the separation means 14, as shown herein, uses a clamping element 15 disposed alongside the feed conveyor 2 and is selectively movable, upon command of a second fluid-operated actuator 16, between a rest position, in which it is spaced apart from the conveyor, and a work position in which it acts in thrust relation on the cassette 3 disposed immediately upstream of the intermediate station 7. This fixes the placement of the trailing or next cassette along the feed conveyor 2 in a position spaced apart from the first or preceding cassette. The trailing cassette is held in place against a fixed abutment 17 which is located at a position laterally opposite the clamping element 15. Preferably, cooperating with the clamping element 15 is a movable abutment 18 disposed downstream of the clamping element. Upon command of a third fluid-operated actuator 19, the movable abutment 18 is moved in the feed direction of the cassettes 3, between a first position in which it is shifted towards the cassettes coming from the conveyor 2 in order to stop the forward movement the cassettes along the conveyor, and a second position in which it is spaced apart from the clamping element 15. This causes the cassette 3, located in the intermediate station 7, to be held apart from the cassette immediately following it which is, instead, retained by the clamping element 15.

More particularly, by virtue of the sequential actuation of the separation means 14, as well as the orientation means 6 acting in the intermediate station 7, when one of the cassettes 3 comes in the vicinity of the movable abutment 18 disposed in the first position, the first photoelectric cell 11 causes operation of the second fluid-operated actuator 16 which brings the clamping element 15 from the rest position to the work position. Under this situation the cassette 3 located immediately upstream of the cassette which has just reached the intermediate station 7 is stopped on the fixed abutment 17, in spite of the dragging action carried out by the feed conveyor 2.

Immediately after the actuation of the clamping element 15, the third fluid-operated actuator 19 is driven and the movable abutment 18 is brought to the second position, so that the dragging action of the feed conveyor 2 causes the separation of the cassette 3 disposed in the intermediate station 7 from the adjacent cassette held by the clamping element 15. When separation has occurred, the first fluid-operated actuator 10 causes the first pusher 9 to move over the first stretch 4 of the conveyor 2, so that the cassette 3 in the intermediate station 7 falls onto the guide chute 8 and, consequently, onto the end stretch 5 of the conveyor 2, in a vertical orientation.

A transferring unit 20 moves the cassettes in succession such that they end up disposed in side-by-side relation on a base wall 21a of a collection element 21 extending perpendicular to the feed conveyor 2. More particularly, the transferring unit 20 preferably comprises at least one second pusher element 22 transversely movable over the end stretch 5 of the feed conveyor 2, upon command of a fourth fluid-operated actuator 23 operatively connected to a second photoelectric cell 23a. In detail, the second pusher element 22 is shiftable between a stand-by position in which it is alongside the end stretch 5 on the opposite side of the end stretch from the collection element 21, and a thrusting position in which it is located close to the collection element 21 for laterally pushing the cassette 3 located at the transferring station 13, in close proximity to the photoelectric cell 23a. The cyclic action of the second pusher 22 on the individual cassettes 3 that are sent in succession to the transferring station 13 causes a cassette row "F" to be formed on the collection element 21 on which the cassettes are disposed consecutively in side by side relation and oriented in respective vertical planes.

Retaining means 24 is associated with the collection element 21 and acts on the cassettes 3 to maintain them in their vertical orientation. The retaining means 24 preferably comprises a support bar 25 extending above the collection element 21. Protruding from the support bar are a plurality of bristles 26 designed to elastically contact the cassettes 3 to produce friction resistance.

Also associated with the collection element 21 is drive means 27 that causes the activation of a fifth fluid-operated actuator 28 which, in turn, causes an angular rotation of the collection element. More particularly, drive means 27 comprises a third photoelectric cell 27 positioned at the end of the collection element 21 opposite the second pusher element 22. When the cassette row "F" formed on the collection element 21, has been completed, the lead cassette 3 is detected by the third photoelectric cell 27. This detection causes the operation of the fifth fluid-operated actuator 28. Upon the actuation of the fifth fluid-operated actuator 28, the collection element 21 is brought from a rest position in which the base surface 21a is oriented horizontally in coplanar relation with the end stretch 5 of the conveyor 2, to a tilted position in which, as shown in FIG. 2, the base surface 21 is oriented obliquely. At that time, the cassette row "F" previously formed on the collection element is dropped into a tray 29 positioned under the collection element 21.

In the embodiment shown, the apparatus 1 uses trays 29 provided with a plurality of seats 29a for receiving the respective cassette rows "F" disposed parallelly in side-by-side relation in an inclined orientation. The presence of the seats 29a gives the lower portion of the tray 29 a toothed profile of a constant pitch. Obviously, the apparatus 1 of the present invention can be adapted to use trays different from the embodiment shown herein.

The positioning of a tray 29 is carried out by supporting and moving means 30 which is selectively operable to displace the tray on a slide surface 31 located under the collection element 21, in a direction substantially perpendicular to the extension of the cassette row "F" formed on the collection element. The supporting and moving means 30 preferably comprises a pair of tracks 32 having movement portions spaced apart parallelly from each other disposed substantially flush with the slide surface 31. In this manner, the tracks 32 interact with the trays 29, at laterally opposite positions, to cause the displacement of the trays 29 along the slide surface 31.

The tracks 32 are driven in operation immediately after movement of the collection element 21 to the tilted position, upon command of the third photoelectric cell 27. A fourth photoelectric cell 33, substantially flush with the sliding surface 31, stops movement of the tracks 32 and hence the tray 29. In more detail, the tray movement is stopped as soon as the first one of the teeth 29b passes in front of the photoelectric cell. Since the teeth 29b are distributed according to a constant pitch, movement of the tray 29 takes place in a movement pitch, corresponding to the distribution pitch of the teeth. In this way, the tray 29 is stopped when it reaches a precise position under the collection element 21. Thus, when the collection element is again brought to the tilted position, the new cassette row "F" correctly engages the corresponding seat 29a.

The movement of the trays 29 to the supporting and moving means 30 is carried out by a feed means 34 that picks up the individual trays from a loading station 35 disposed at a raised position from the slide surface 31. More particularly, the feed means 34 in the loading station 35 consists of at least two support elements 36 that, in the operating condition, support a stack "P" formed with trays 29, as shown in FIG. 2, by their action on opposite rims of the tray 29 in the lowermost position in the stack. In the embodiment shown, two pairs of support elements 36 are provided, each acting on one of the opposite rims of the tray 29. Upon command of respective auxiliary fluid-operated actuators 37, the support elements 36 are rotated about the axis of corresponding interconnecting shafts 38, from an operating position in which they are disposed in mutual side-by-side relation supporting the tray stack "P", to a release position in which, as shown in FIG. 1, the support elements of each pair are spread open to let the tray stack "P" fall down.

The tray feeding means further comprises at least one reception platform 39 vertically movable upon command of a raising actuator 40 between a rest position in which it is disposed substantially flush with the slide surface 31, between the tracks 32, and a catching position in which it is raised from the slide surface 31 and moved close to the tray stack "P". As shown in FIG. 2, this stops the tray stack from falling when the support elements 36 are brought to the release position.

When the tray 29 located under the collection element 21 is positioned to receive the cassette row "F" in the last available housing seat 29a, the light beam issued by a fifth photoelectric cell 41, oriented obliquely to the tray feeding direction, is picked up by a receiving member 41a to drive the feed means 34 to dispose a new tray 29 on the slide surface 31. In this situation, the reception platform 39 is brought to the receiving position, the support elements 36 being afterwards moved from the operating position to the release position. Thus, the tray stack "P" falls onto the reception platform 39 with a downward displacement sufficient to enable the lowermost tray 29 to be brought beyond the action area of the support elements 36.

The support elements 36 are then brought back to the operating position. In this state, they are ready to engage the side rims of the next tray immediately following the tray 29 put on the reception platform 39, to again support the tray stack "P". At this point the raising actuator 40 brings the reception platform 39 to the rest position again, laying down the tray 29 on the tracks 32 associated with the supporting and moving means 30.

In order to ensure separation of the tray 29 disposed on the reception platform 39 from the overlying trays, provision is advantageously made for at least one hooking element 42 to be associated with the platform and elastically oscillatable about a horizontal axis, as shown in FIG. 2. This hooking element 42 is adapted to engage the side rim of the lowermost tray 29 in the stack "P" and drag it along with the reception platform 39 during the descending movement thereof.

When the last housing seat 29a is filled with a cassette row "F", the tracks 32 are driven until the first one of the teeth 29b of a new tray 29 intercepts the light beam of the fourth photoelectric cell 33. This disposes the first housing seat 29a of this new tray in a position to receive a new cassette row "F". In the meantime, the track movement which brings the new tray into position to receive a new row "F" also moves the tray 29 filled with the cassettes 3 away from the action area of the collection element 21.

The present invention can be arranged so that a single apparatus can be associated with a great number of cassette assembly machines, cassette loading machines, cassette boxing machines or cassette labelling machines. Thus, by virtue of the present apparatus and method the manpower hitherto required can be eliminated.

Obviously one of skill in the art can make many modifications and variations to the disclosed embodiment without departing from the spirit or intent of the present invention.

What is claimed is:

1. An apparatus for disposing cassettes into trays comprising:

a primary feed conveyor for moving cassettes in a feed direction;

means for moving said primary feed conveyor;

a secondary feed conveyor extending parallel to the primary feed conveyor;

means for moving said secondary feed conveyor;

a guide chute extending laterally from said primary feed conveyor and leading to said secondary feed conveyor;

a pusher element movable over said primary feed conveyor in alignment with said guide chute, between a stand-by position in which it is disposed alongside said primary feed conveyor, and a thrusting position in which it is moved close to said guide chute to push the cassette coming from said primary feed conveyor onto said guide chute;

a transferring unit for disposing of cassettes received from said secondary feed conveyor onto a collection element movable between a rest position and a working position;

drive means for moving the collection element, when a given number of cassettes have been transferred thereon, from the rest position to the working position; and at least one tray for receiving cassettes from the collection element when the collection element is in the working position.

2. The apparatus as claimed in claim 1, wherein said transferring unit comprises at least one second pusher element transversely movable over said secondary feed conveyor between a stand-by position in which it is disposed alongside said secondary feed conveyor, and a thrusting position in which it is located close to the collection element in order to push the cassette onto the collection element.

3. The apparatus as claimed in claim 2, further comprising retaining means associated with the collection means for opposing a controlled friction resistance to the cassettes thereon.

4. The apparatus as claimed in claim 3, wherein said retaining means comprises a support bar extending parallelly above the collection element and carrying at a lower part thereof a plurality of bristles arranged to elastically act against the cassettes on the opposite side with respect to a base surface of the collection element so as to produce the friction resistance.

5. The apparatus as claimed in claim 1, further comprising separation means operating on said primary feed conveyor and acting on each cassette in order to separate it from a previous cassette disposed on said primary feed conveyor.

6. The apparatus as claimed in claim 5, wherein said separation means comprises a clamping element disposed alongside said primary feed conveyor and selectively movable between a rest position, in which it is spaced apart from said primary feed conveyor, and a work position in which it acts in thrust relation on one of the cassettes in order to fix the positioning thereof along said primary feed conveyor.

7. The apparatus as claimed in claim 6, wherein said separation means further comprises at least one movable abutment disposed downstream of the clamping element and movable in the cassette feed direction between one work position in which it is shifted towards the cassettes coming from the primary feed conveyor in order to stop the forward movement of said cassettes, and a second work position in which it is moved apart from the clamping element to permit one of the cassettes to be separated from the cassette coming immediately after it and held by the clamping element.

8. The apparatus as claimed in claim 1, further comprising a tray feeding means for sending individual trays, in succession, to a supporting and moving means.

9. The apparatus as claimed in claim 8, wherein said tray feeding means comprises at least two support elements selectively movable between an operating position in which they are disposed in mutual side-by-side relation for supporting one tray stack, and a release position in which they are mutually spread open to let the tray stack fall down; and a reception platform vertically movable between a receiving position in which it is disposed close to the tray stack to stop the falling of the tray stack when the support elements are brought to the release position, and a rest position in which it is disposed substantially-flush with a slide surface so as to deposit the lowermost tray picked up from the tray stack onto said supporting and moving means.

10. The apparatus as claimed in claim 9, wherein associated with the reception platform is at least one hooking element arranged to engage a side rim of the lowermost tray in the tray stack when the platform is in the reception position.

11. The apparatus as claimed in claim 9, wherein said supporting and moving means comprises a pair of tracks exhibiting respective movement portions acting parallelly flush with the slide surface and extending laterally on opposite sides relative to the reception platform.

12. An apparatus for disposing cassettes into trays comprising:

a feed conveyor for moving cassettes in a feed direction;

motor means for moving said feed conveyor;

a transferring unit for disposing of cassettes received from said feed conveyor onto a collection element movable between a rest position and a working position, wherein said transferring unit comprises at least one second pusher element transversely movable over said feed conveyor between a stand-by position in which it is disposed alongside said conveyor, and a thrusting position in which it is located close to the collection element in order to push the cassette onto the collection element;

retaining means associated with the collection means for opposing a controlled friction resistance to the displacement of the cassettes thereon, wherein said retaining means comprises a support bar extending parallelly above the collection element and carrying at a lower part thereof a plurality of bristles arranged to elastically act against the cassettes on the opposite side with respect to a base surface of the collection element so as to produce said predetermined friction resistance;

drive means for moving the collection element, when a given number of cassettes has been transferred thereon, from the rest position to the working position; and at least one tray for receiving cassettes from the collection element when the collection element is in the working position.

13. The apparatus as claimed in claim 12, further comprising separation means operating on said feed conveyor and acting on each cassette in order to separate it from a previous cassette disposed on said feed conveyor.

14. The apparatus as claimed in claim 12, further comprising a tray feeding means for sending individual trays, in succession, to a supporting and moving means to be aligned to receive cassettes from the collection element.

15. An apparatus for disposing cassettes into trays comprising:

a feed conveyor for moving cassettes in a feed direction;

motor means for moving said feed conveyor;

a transferring unit for disposing of the cassettes received from said feed conveyor onto a collection element movable between a rest position and a working position;

separation means operating on said feed conveyor and acting on each cassette in order to separate it from a previous cassette disposed on said feed conveyor, wherein said separation means comprises a clamping element disposed alongside said feed conveyor and selectively movable between a rest position, in which it is spaced apart from the conveyor, and a work position in which it acts in thrust relation on one of the cassettes in order to fix the positioning thereof along said feed conveyor;

drive means for moving the collection element, when a given number of cassettes has been transferred thereon, from the rest position to the working position; and at least one tray for receiving cassettes from the collection element when the collection element is in the working position.

16. The apparatus as claimed in claim 15, wherein said separation means further comprises at least one movable abutment disposed downstream of the clamping element and movable in a cassette feed direction between one work position in which it is shifted towards the cassettes coming from said feed conveyor to stop the forward movement of the cassettes, and a second work position in which it is moved apart from the clamping element to permit one of the cassettes to be separated from the cassette coming immediately after it and held by the clamping element.

17. The apparatus as claimed in claim 15, wherein said transferring unit comprises at least one second pusher element transversely movable over said feed conveyor between a stand-by position in which it is disposed alongside the conveyor, and a thrusting position in which it is located close to the collection element in order to push the cassette onto the collection element.

18. The apparatus as claimed in claim 15, further comprising a tray feeding means for sending individual trays, in succession, to said supporting and moving means to be aligned to receive cassettes from the collection element.

19. An apparatus for disposing cassettes into trays comprising:

a feed conveyor for moving cassettes in a feed direction;

motor means for moving said conveyor;

a transferring unit for disposing cassettes received from said feed conveyor onto a collection element movable between a rest position and a working position;

drive means for moving the collection element, when a given number of cassettes have been transferred thereon, from the rest position to the working position;

at least one tray for receiving cassettes from the collection element when the collection element is in the working position; and a tray feeding means for sending individual trays, in succession, to a supporting and moving means, wherein said tray feeding means comprises at least two support elements selectively movable between an operating position in which they are disposed in mutual side-by-side relation for supporting a tray stack, and a release position in which they are mutually spread open to let the tray stack fall down, and a reception platform vertically movable between a receiving position in which it is disposed close to the tray stack in order to stop the falling of the tray stack when the support elements are brought to the release position, and a rest position in which it is disposed substantially flush with a slide surface so as to deposit the lowermost tray picked up from the tray stack onto said supporting and moving means.

20. The apparatus as claimed in claim 19, wherein associated with said reception platform is at least one hooking element arranged to engage a side rim of the lowermost tray in said stack when the platform is in a reception position.

21. The apparatus as claimed in claim 19, wherein said supporting and moving means comprises a pair of tracks exhibiting respective movement portions acting parallelly flush with the slide surface and extending laterally on opposite sides relative to the reception platform.

22. The apparatus as claimed in claim 19, wherein said transferring unit comprises at least one second pusher element transversely movable over said feed conveyor between a stand-by position in which it is disposed alongside the conveyor, and a thrusting position in which it is located close to the collection element to push a cassette onto the collection element.

23. The apparatus as claimed in claim 19, further comprising separation means operating on said feed conveyor and acting on each cassette in order to separate it from the previous cassette disposed on said feed conveyor.

* * * * *